United States Patent [19]

Shields

[11] Patent Number: 5,773,110
[45] Date of Patent: *Jun. 30, 1998

[54] WINDOW PAINTING APPARATUS AND METHOD

[75] Inventor: Rodney M. Shields, Lafayette, Calif.

[73] Assignee: Creative Minds Foundation, Wilmington, Del.

[ * ] Notice: The term of this patent shall not extend beyond the expiration date of Pat. No. 5,609,938.

[21] Appl. No.: 203,181

[22] Filed: Feb. 28, 1994

[51] Int. Cl.⁶ .............................. B05D 5/00; G09F 19/02
[52] U.S. Cl. .......................... 428/40.1; 52/105; 52/171.3; 359/594; 427/96; 427/259; 427/264; 427/265; 427/266; 428/41.6; 428/41.7; 428/41.8; 428/42.1; 428/138; 428/187; 428/191; 428/195; 428/204
[58] Field of Search ............................ 428/40, 187, 191, 428/204, 195, 138; 52/105, 171.3; 359/594; 427/259, 264, 265, 266, 96

[56] References Cited

U.S. PATENT DOCUMENTS

| | | | |
|---|---|---|---|
| 1,202,593 | 10/1916 | Scott | 40/219 |
| 2,931,117 | 4/1960 | Bosworth et al. | 156/63 |
| 3,661,664 | 5/1972 | Lundell | 40/219 |
| 3,707,792 | 1/1973 | Mabrey et al. | 40/219 |
| 3,853,675 | 12/1974 | Edwards | 428/77 |
| 4,033,619 | 7/1977 | Cox | 40/219 |
| 4,056,648 | 11/1977 | Richardson | 428/138 |
| 4,070,781 | 1/1978 | Sauer | 40/219 |
| 4,168,978 | 9/1979 | Koenig | 428/199 |
| 4,242,401 | 12/1980 | Mitani et al. | 427/282 |
| 4,246,713 | 1/1981 | Eckert | 40/437 |
| 4,261,649 | 4/1981 | Richard | 350/276 R |
| 4,278,022 | 7/1981 | Fitzpatrick et al. | 428/282 |
| 4,358,488 | 11/1982 | Dunklin et al. | 428/31 |
| 4,522,864 | 6/1985 | Humason et al. | 428/201 |
| 4,527,890 | 7/1985 | Heiart et al. | 355/100 |
| 4,590,138 | 5/1986 | Lambert et al. | 430/25 |
| 4,673,609 | 6/1987 | Hill | 428/187 |
| 4,925,705 | 5/1990 | Hill | 427/259 |
| 5,138,782 | 8/1992 | Mizobe | 40/219 |

FOREIGN PATENT DOCUMENTS

| | | |
|---|---|---|
| 51-86049 | 12/1976 | Japan . |
| 54-93255 | 12/1979 | Japan . |
| 4-4089 | 2/1992 | Japan . |

OTHER PUBLICATIONS

Smith, Turk, "Screen Acts Like A Mirror", *The Arizona Republic*, p. 10–E, Mar. 8, 1979. Phoenix, Arizona.
Shadow Screen Co., Inc. Catalog, 1979, Phoenix, Arizona.
American Scenics Catalog, c. 1979.
Advertising for 3M–France One–Way Vision Film, 1988.
Deco Ader Product Brochure for Perforated One–Way Vision Self–adhesive Panel Assembly, France, publication date circa 1980.

*Primary Examiner*—Nasser Ahmad
*Attorney, Agent, or Firm*—Feix & Feix

[57] ABSTRACT

An improved display product and method of making a display wherein a perforated panel is provided with layers of paint which are kept on the panel. Thus, a sign painter can have a wide latitude of designs which can be applied to see-through graphics. The resulting product can be opaque to an observer looking from one side of a display product yet the observer is able to see through the product from the other side of the product. A window to be provided with a display product is masked with masking paper and masking tape to cover the exposed parts. A perforated panel is cut to fit the window and attached over the masking paper and the masking tape. The perforated panel is painted with an image that is desired.

18 Claims, 6 Drawing Sheets

WINDOW PAINTING APPARATUS AND METHOD

This invention relates to techniques for the painting of transparent panels, such as windows, which permits messages, signs, and other such displays to be affixed to and displayed on such panels while permitting the passage in one direction but not in the opposite direction of visible light through light passages.

BACKGROUND OF THE INVENTION

In the practice of window painting for advertising or promotional purposes, it is desirable to create as large an eye-catching a display as possible. Generally, however, a display across a window will block any light which would otherwise come through the window. Thus, this light cannot add to the interior lighting requirement of the structure or store having the window. Additionally, in such structures as banks where security is of importance, not being able to see out through the windows can present serious security problems. Security can be important to the safety and well-being of the bank customers and employees.

Painted window graphics is one of the largest segments in the sign painting industry. They can be seen practically everywhere—at banks, restaurants, and retail stores. Yet, traditional painted window graphics look untidy from a location inside of the window, as well as blocking natural light into and through the store window and out of the window. Typically, from the reverse side of an image on the graphics, the appearance of the image looks poorly and can be a great distraction, and this is a well-known objection to the use of such images upon window surfaces.

Hill, U.S. Pat. No. 4,673,609, discloses a method of painting one-way graphics onto windows by the use of a mask applied to the window where paint goes through the holes to adhere directly to the glass. There are many problems associated with this method.

1. If the mask does not adhere properly, the paint will bleed under the mask and create unsightly irregular or ragged patterns of dots.
2. Removal of the mask may remove portions of the color or lift entire dots from the surface of the glass.
3. Removal of the graphics from the glass is labor intensive, requiring the use of aggressive window cleaning techniques including scraping the paint from the window, the use of cleaning agents, or the use of high pressure sprays.
4. During the removal of painted graphics from the surface of the glass, the washed off or scraped off paint particles can stain the surrounding areas such as window frames or sills, wall areas, landscaping and walkways.
5. Multiple coats of paint are required to achieve one way graphics; first a black or dark coat is applied and then after the black coat has dried, then at least one coat of the background color is required to cover the black coating.
6. One way graphics painted directly onto glass require a significant investment of time both in the application of several coats of paint and in the labor-intensive removal methods required.

It could be well if the use of such images did not block the light or the view that is the intended function of the window, because the benefit of such images would be great.

The display product and method of this invention seeks to solve these problems.

SUMMARY OF THE INVENTION

The present invention is directed to an improved display product and method of making the display wherein a perforated panel is provided with layers of paint which are kept on the perforated panel. Thus, depending upon the type of display which is desired, the sign painter using the teachings of the present invention can have a wide latitude of designs which can be applied to see-through graphics. The resulting product can be substantially opaque to an observer looking from one side of a display product yet the observer is able to see through the product from the other side of the product itself.

For the sign painter who wants quality and durability with the ability to create see-through graphics, the preferred embodiment is a superior display product for hand painted one-way graphics. An image is painted onto a perforated panel, and then the panel is applied to window surfaces. This allows durable and high quality paints to be used for longer term graphics displays, compared to traditional painted window graphics.

The preferred embodiment is for use on masked windows since it has a perforated liner that could allow the paint to go through the liner. For unmasked windows, or for applications where it is desired to do the painting in locations other than the site of the installation, a different version could have an additional liner which would prevent the paint from bleeding through.

In the preferred embodiment of the present invention, a window to be provided with a display product is masked with masking paper and masking tape to cover the exposed parts. A perforated panel is cut to fit the window and attached over the masking paper and the masking tape. The perforated panel is painted with an image that is desired. Once the painting is completed, the panel is taken away from the masking paper, and the masking paper and the masking tape are removed and discarded. The painted panel with the one or more layers of paint thereon is applied to the window which was previously covered by the masking tape and the masking paper. The perforated panel could have an adhesive coating that would have a protective backing liner to protect the adhesive. This liner is peeled off when as the perforated panel is peeled or separated from the backing masking paper and masking tape, thus, leaving the holes of the perforated panel free as well as holes in the painted liner.

Once the perforated panel with paint thereon is applied to the window, the assembly of panel and paint layers is complete and an observer looking in the direction of the panel will see through the panels without seeing the paint layer and the observer looking at the paint layer from a distance will not see the interior of the space or the opposite side of the panel from the window side.

Typically, the perforated panel is applied by an adhesive to the masking paper but it also can be applied by other methods, such as tape, double-stick tape, sprayed adhesive, suction cups and the like. The perforated panel can be backed by a non-perforated backing layer either with or without an adhesive layer therebetween. Such removable backing liner would eliminate the need for masking of the windows in many installations.

The primary object of the present invention is designed to provide an improved painted display product and method of making the product wherein a perforate panel is used to form a display product on a glass surface or window and in which the display product is possible due to the placement of the perforate panel on the window. Thus the observer can view the image from one side of the window surface, but not from the other side, all of which gives wider latitude to the formation of designs on window surfaces in an efficient, economical manner.

Other objects of this invention will become apparent as the following specification progresses, reference being had to the accompanying drawings for an illustration of the invention.

BRIEF DESCRIPTION OF THE DRAWINGS

FIGS. 10, 11 and 12 are vertical sections through the panel assemblies of FIGS. 7, 8 and 9, respectively.

DETAILED DESCRIPTION OF THE PREFERRED EMBODIMENT

Figure 1:
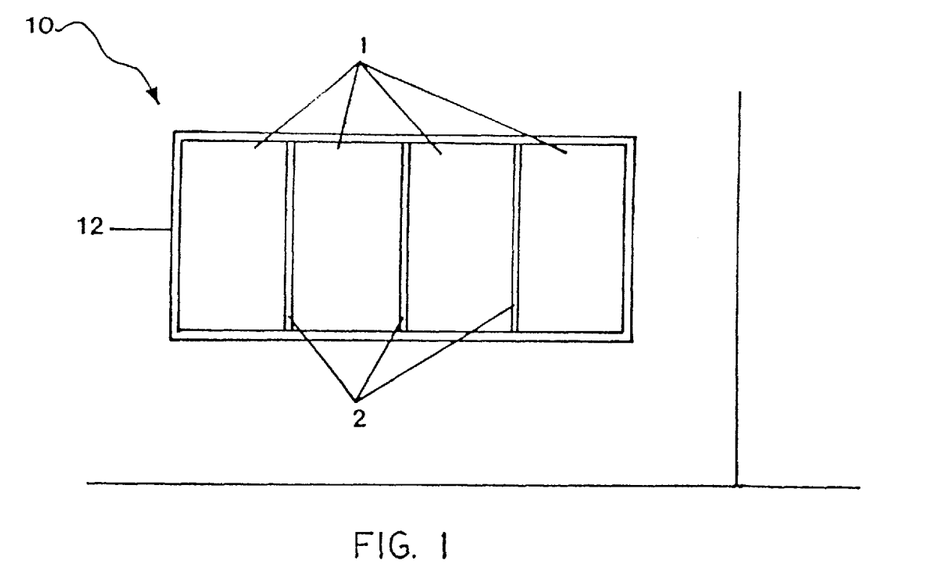
FIG. 1 is a side elevational view of a window to be provided with the design of the present invention covered by masking paper and tape.

In a preferred embodiment of the invention denoted by the numeral 10 having clear glass panes or window 12 (FIG. 1) is provided with a masking tape 2 around the exposed window hardware and a masking paper sheet 1 is applied to the window on one surface thereof.

Figure 2:
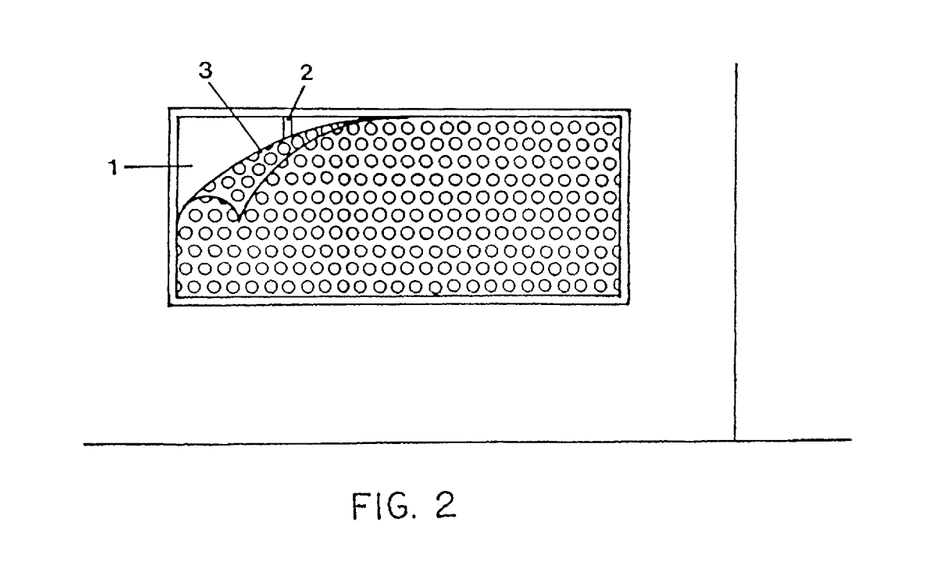
FIG. 2 is a view similar to FIG. 1 but showing a perforated panel applied over masking tape and masking paper on the window.

A perforated panel 3 is shown in FIG. 2 as applied to and fitted with the window on one side of the transparent or translucent pane or surface thereof. The perforated panel 3 is cut to fit the window. Panel 3 is hung in place with double-stick tape strips, the attachment being in covering relationship to the masking paper 1 and the masking tape 2.

Figure 3:
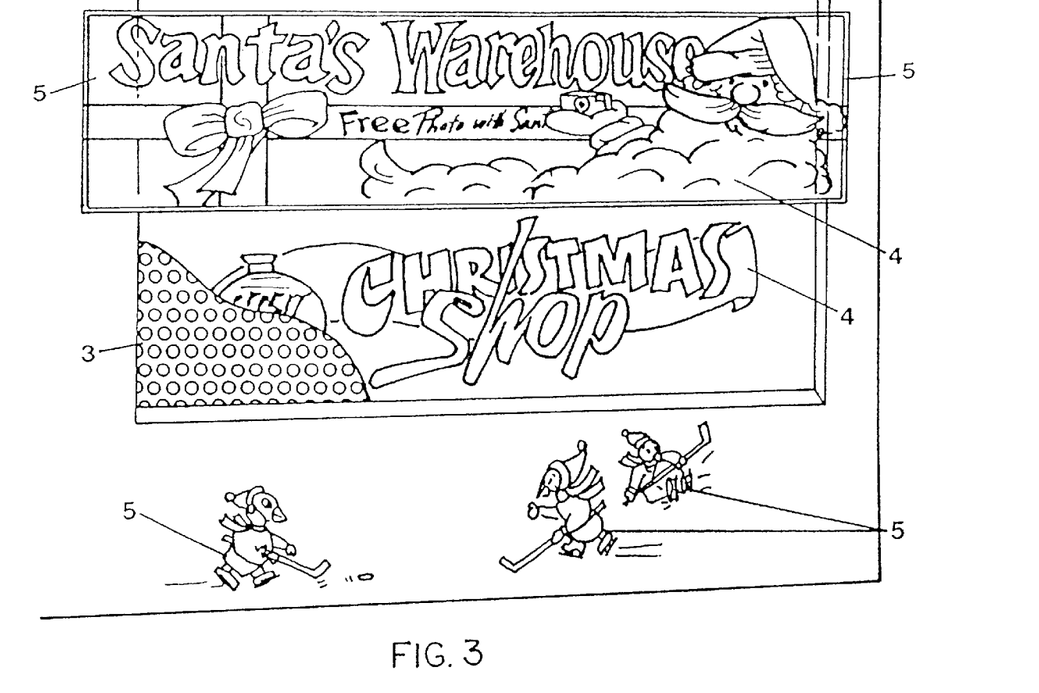
FIG. 3 is a view of the window with the perforated panel mounted on the masking tape and masking paper applied to the window surface, and a paint layer applied to the perforated panel and to areas around the window.

The outer surface of the panel 3 is painted with an image denoted by the numeral 4 (FIG. 3) as desired. In applications where the window will have the graphics to match the image around the window on large continuous graphics, for example, the entire scene can be painted at one time including the masked windows covering the perforated panels. The numeral 5 shows portions of the image that extend onto the surrounding surfaces of the structure that supports the window. Since the same paint is used on the assembly and the rest of the site to be painted, and the painting is all done at one time, there will be little noticeable difference between a portion of the image on the panel and the rest of the graphic, yet persons on the inside of the window can still see out through the window to the outside of the building or structure which the window forms a part.

Figure 4:
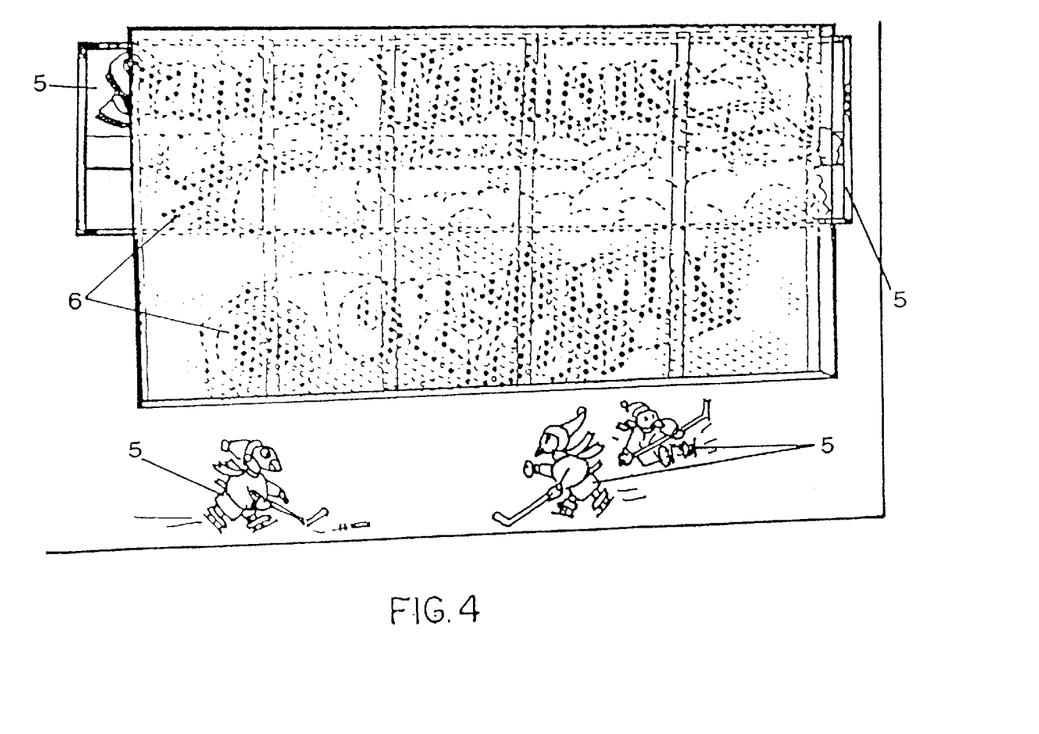
FIG. 4 is a view similar to FIG. 3 but showing the masking paper and masking tape to which are applied the dots of paint passing through the holes of the perforated panel, the result being observed when the panel and tape layer are peeled off the masking tape and masking paper.

Once the painting layer has completely dried, the panel 3 is separated from and taken off the masking paper and masking tape. Then, after the masking paper and masking tape have been taken off the window surface, they are discarded as they are no longer needed to carry out the teachings of the present invention. FIG. 4 shows a portion of the paint dots 6 on a masking paper and masking tape but this is not the image which is desired. The desired image is painted on the outer surface of the perforated panel 3 (FIG. 6) and this panel has been separated from the masking paper 1 and a masking tape 2.

Figure 5:
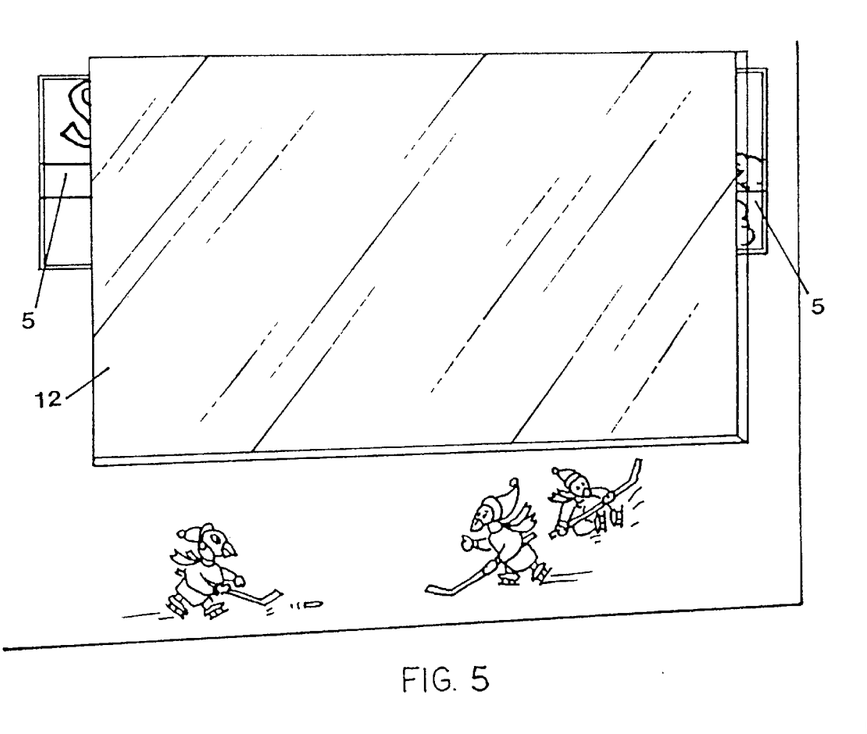
FIG. 5 shows the window after the masking paper and masking tape have been removed, portions of the image not on the window remaining.

FIG. 5 shows the windows from which the masking paper 1 and the masking tape 2 have been removed. The end portions of the image not on the window remain on the panel.

Figure 6:
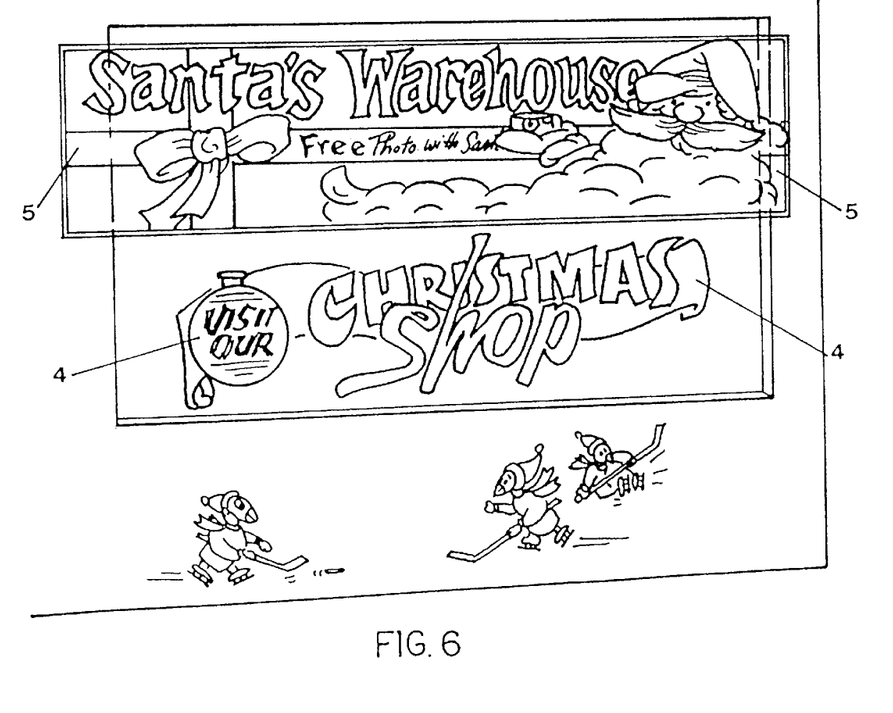
FIG. 6 is a view similar to FIG. 4 but showing the painted panel 8 installed on the window surface with the remaining image portions aligned with the surrounding graphics.

After the masking paper and masking tape have been removed from the window, the perforated panel with the layers of paint forming the image 4 on the panel are applied to the window surface as shown in FIG. 6, and the holes in the perforated panel allow the observer to see through the panel from one side of the window but an observer can only see the image in the form of the paint layers when looking at the window from the other side of the window.

The panel could have an adhesive coating that would have a protective backing liner to protect the adhesive until ready for use. The assembly could be done either before or after the perforation of the panel. To install the painted panel in this configuration, the backing liner of the assembly is first removed to expose the adhesive backing; then, the image on the assembly is aligned with the surrounding graphics and the assembly is smoothed out onto the surface of the window, thus attaching the perforated panel and the image to the window surface. Another possibility of the installation would be to affix the perforated panel to the glass window surface in some other method such as by an adhesive or tape, a double-stick tape, spray adhesive, suction cups and the like.

The panel can be backed with a non-perforate backing either with or without the adhesive layer in a protective backing liner which could or would eliminate the need for the masking of the windows in many installations.

Figure 7:
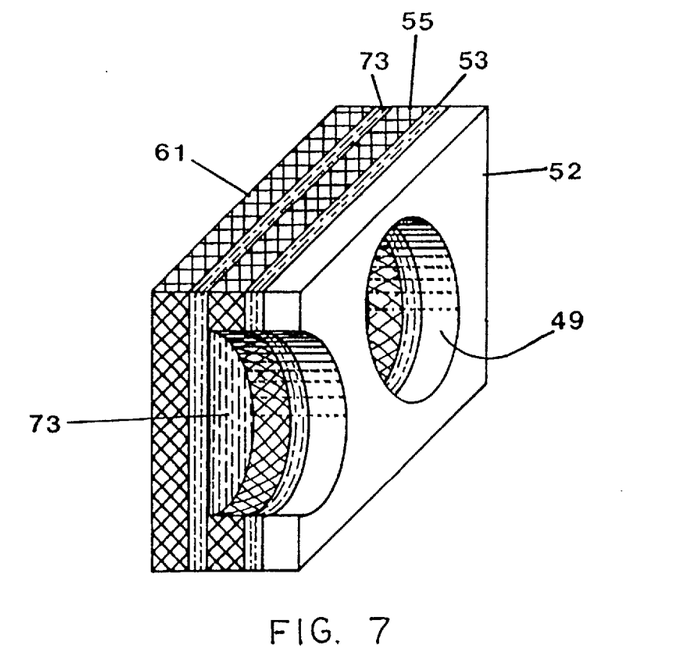
FIG. 7 shows a fragmentary perspective view of the assembly of layers capable of holding the design of the present invention.

FIG. 7 shows a cross-sectional view of an embodiment with a non-perforated backing paper. This configuration uses transparent materials which could be affixed to the glass and is provided for configurations which could be used for applications where the image would be viewed through the glass panel. The panel on which the image is to be painted or printed, broadly denoted by the numeral 52, is transparent and is backed with a transparent adhesive layer 53 which could also be an electrostatically charged surface as in static cling plastic materials.

The adhesive layer 53 is protected by a removable backing liner 55. These three elements, namely panel 52, clear adhesive 53, and backing liner 55 could form an assembly of layers which could be perforated with holes 49 together. The assembly of these three layers would then be bonded or laminated onto a perforated removable backing material or layer 61, by an adhesive 73. The adhesive as shown is applied to the backing and then the assembly 55 and 73 is laminated to the assembly of layers 52, 53 and 55. The adhesive 73 could be applied to the back of the removable backing liner 55 to adhere the non-perforated removable backing material 61 to the assemblies 52, 53 and 55. Alternately, layers 52 and 53 can be backed directly to non-perforated removable backing layer 61.

It is only necessary that the panel which is to be painted or printed upon, namely panel 52, be perforated. All other elements except the backing material 73 can be perforated or not as desired.

Figure 8:
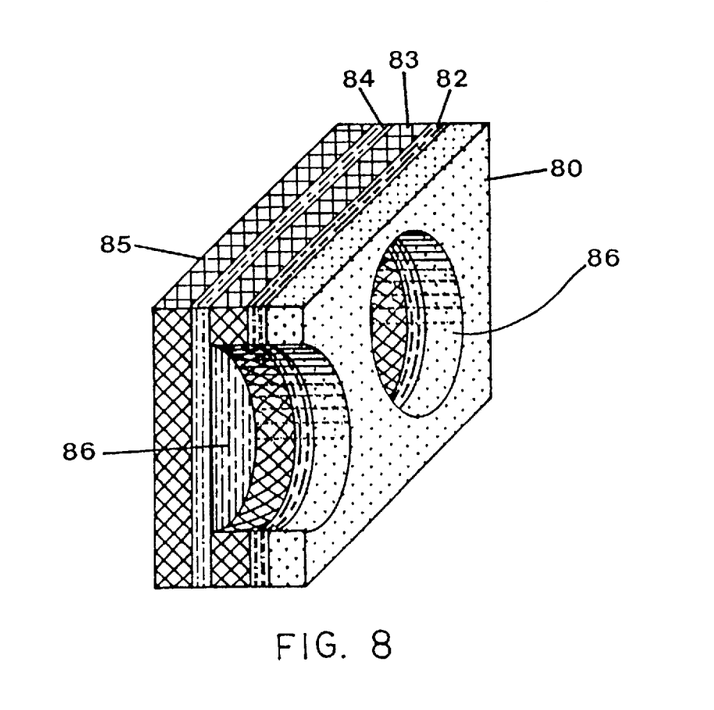
FIG. 8 is a view similar to FIG. 7 but showing a slightly modified form from that shown in FIG. 7.

FIG. 8 shows perspective views of an embodiment wherein the image can be visible over the surface of the glass. The panel 80 on which the image is to be painted or printed is opaque material. Panel 80 is backed with a dark colored adhesive 82. The adhesive layer 82 is protected by a removable backing layer 83. These three elements, namely elements 80, 82 and 83 could form an assembly which permits the elements to be perforated with holes 86 together. The assembly of layers 80, 82 and 83 would then be bonded to or laminated to a backing material 85 by an adhesive 84. The adhesive as shown is applied to the backing liner 85 and then the assembly of layers 84 and 85 is laminated to the assembly layers 80, 82 and 83. The adhesive would be applied to the back of the layer 83 to adhere the backing material layer 85 to the exposed assembly of layers 80, 82 and 83. Layers 80 and 82 could be backed with a non-perforated removable backing layer 85.

It is only necessary that the panel which is to be painted or printed upon, namely panel 80, be perforated. All of the other elements, except the printed material at layer 85 can be perforated or not, as desired. The backing should be solid for most applications.

Figure 9:
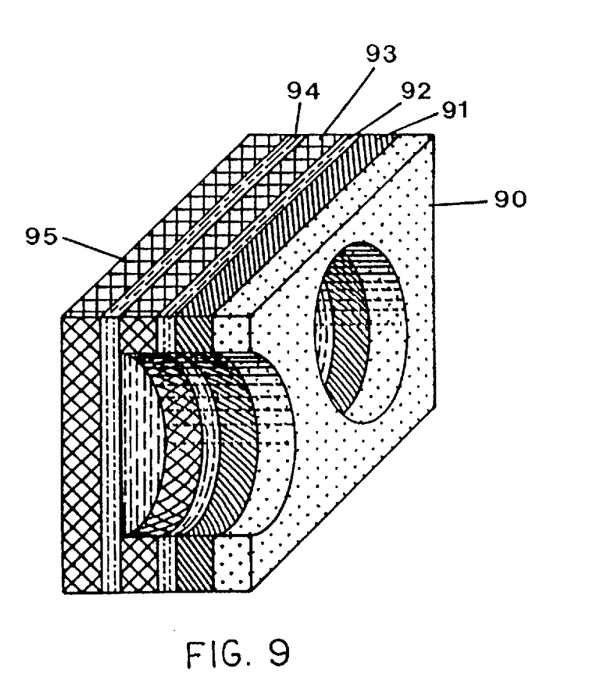
FIG. 9 is a view similar to FIGS. 7 and 8 but showing black adhesive backing for the stack of the present invention.

FIG. 9 shows a view similar to FIGS. 7 and 8 in which the opaque panel 90 has a dark colored layer 91 with an adhesive 92 which could also be an electrostatically charged film as in static cling plastic materials, a transparent adhesive or a dark colored adhesive. The adhesive layer 92 is protected by a removable backing liner 93. These four elements could form an assembly which could be perforated together. The assembly of elements 90, 91, 92 and 93, would then be bonded or laminated to a backing material 95 by an adhesive 94. The adhesive is applied to the backing and then the assembly 94 and 95 is laminated by the assembly of 90, 91 and 92. The adhesive could be applied to the back of the removable liner 93 to adhere the backing material 95 to the assembly 90, 91 and 92. Layers 90, 91 and 92 could be backed with a non-perforated removable backing layer 95.

It is only necessary that panel 90 which is to be painted or printed upon be perforated. All the other elements except the backing material 95 can be perforated or not, as desired. The backing material should be solid for most applications.

Figure 10:
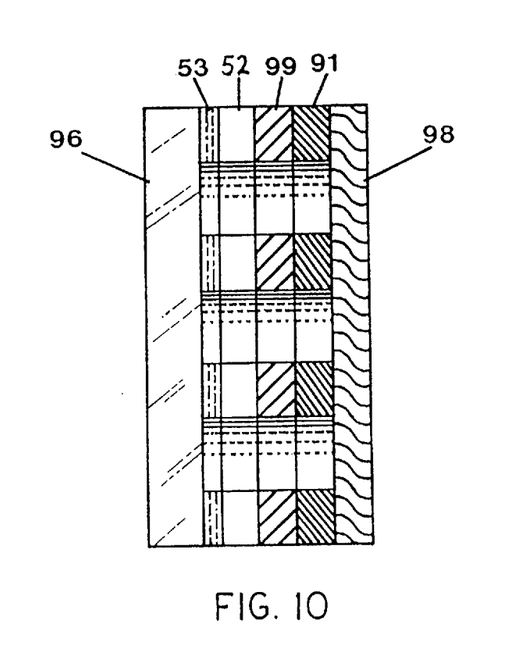
Figure 11:
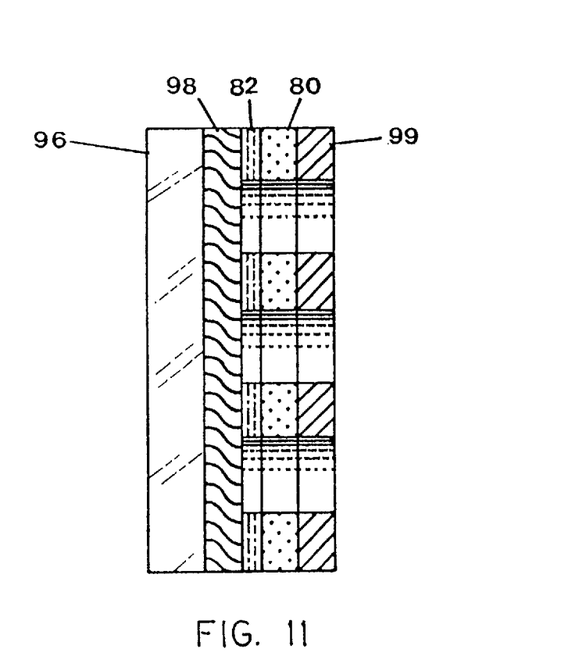
Figure 12:
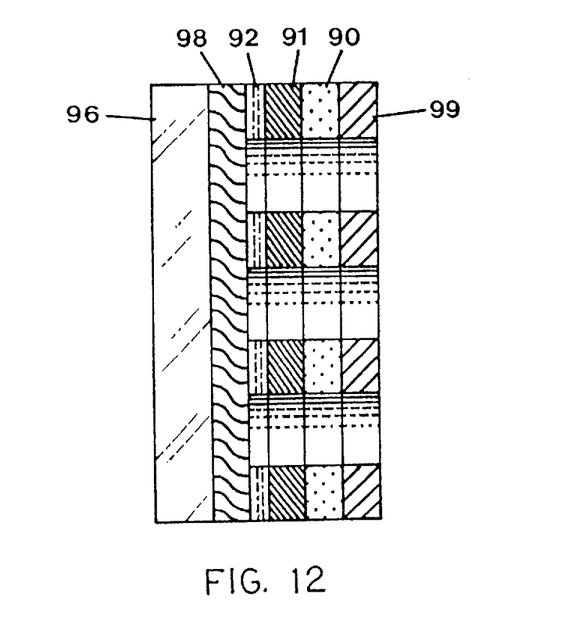

In FIGS. 10–12, the image 99 is viewable from the left in FIG. 10 and from the right in FIGS. 11 and 12. FIGS. 10, 11 and 12 show the addition of a semitransparent material 98 such as a partially tinted film or metalized film commonly known as one-way mirror film or window tinting. The addition of this semitransparent material allows the one-way printing effect to compensate for different light levels and would offer a greater degree of "one-way vision", which would have many applications in the field of security or surveillance. FIGS. 10, 11 and 12 also show the panels adhered to a window material such as glass or plastic 96, after the backing materials have been removed and discarded. FIG. 10 also shows the perforated adhesive backed panel 52 of FIG. 7 printed with an image 99 and overlayed with a dark color layer 91.

What is claimed is:

1. A method of painting a window with a one-way vision image, wherein the image is visible when viewed from one side of the window and wherein the image appears substantially transparent when viewed from the other side of the window, the method comprising the steps of:

providing a panel assembly comprising a panel layer having a first panel side for receiving an image and a second panel side for mounting to a window, the panel assembly further including a protective liner removably attached to said second panel side;

perforating the panel assembly with a plurality of through-holes;

applying a removable solid backing layer to a protective liner side of the perforated panel assembly;

temporarily mounting the perforated panel assembly with solid backing layer to a window;

painting said first panel side of said panel layer with at least one layer of paint to form an image on non-perforated portions of said panel layer, said solid backing layer preventing excess paint which travels through said plurality of through-holes in said panel assembly from contacting the window;

removing said perforated panel assembly along with said solid backing layer from the window; and peeling back said protective liner from said panel layer and adhering said panel layer to the window.

2. The method according to claim 1 wherein said protective liner is removably attached to said second panel side of said panel layer by an adhesive layer.

3. The invention according to claim 1, wherein said panel layer comprises static cling plastic material.

4. The method according to claim 2 wherein:
   said panel layer comprises transparent material; and
   said painting step includes applying separate paint layers of light-reflective color and dark color.

5. The method according to claim 3 wherein:
   said panel layer comprises transparent material; and
   said painting step includes applying separate paint layers of light-reflective color and dark color.

6. The method according to claim 2 wherein:
   said adhesive layer is colored black;
   said panel layer comprises transparent material; and
   said painting step includes applying a layer of light-reflective color.

7. A method of painting a window with a one-way vision image, wherein the image is visible when viewed from one side of the window and wherein the image appears substantially transparent when viewed from the other side of the window, the method comprising the steps of:

providing a panel assembly comprising a panel layer having a first panel side for receiving an image and a second panel side for mounting to a window, the panel assembly further including a protective liner that is removably attached to said second panel side;

perforating the panel assembly with a plurality of through-holes;

masking a window to be painting with a masking sheet;

temporarily mounting the perforated panel assembly over the masking sheet;

painting said first panel side of said panel layer with at least one layer of paint to form an image on non-perforated portions of said panel layer, said masking sheet for catching excess paint which travels through said plurality of through-holes and for preventing paint from contacting the window;

separating said perforated panel assembly from said masking sheet;

removing said masking sheet from the window; and peeling back said protective liner from said panel layer and adhering said panel layer to the window.

8. The method according to claim 7 wherein said protective liner is removably attached to said second panel side of said panel layer by an adhesive layer.

9. The invention according to claim 7 wherein said panel layer comprises static cling plastic material.

10. The method according to claim 8 wherein:

said panel layer comprises transparent material; and said painting step includes applying separate paint layers of light-reflective color and dark color.

11. The method according to claim 9 wherein:

said panel layer comprises transparent material; and said painting step includes applying separate paint layers of light-reflective color and dark color.

12. The method according to claim 8 wherein:

said adhesive layer is colored black;

said panel layer comprises transparent material; and said painting step includes applying a layer of light-reflective color.

13. A one-way vision panel assembly bearing an image for application to a window, wherein upon application to the window the image is visible when viewed from one side of the window and the image appears substantially transparent when viewed from the other side of the window, the panel assembly comprising:

an assembly comprising a panel layer having a first panel side for receiving an image and a second panel side for mounting to a window, said assembly further including a protective liner removably attached to said second panel side;

said assembly is perforated with a plurality of through-holes;

a solid backing layer removably attached to a protective liner side of the perforated assembly, wherein:

said solid backing layer effective to catch excess paint which travels through said plurality of through-holes as one or more layers of paint are applied to said first side of said panel layer; and said solid backing layer, along with said protective liner, are removable to is permit said second side of said panel layer to be adhered to the window.

14. The one-way vision panel assembly according to claim 13 wherein said protective liner is removably attached to said second panel side of said panel layer by an adhesive layer.

15. The one-way vision panel assembly according to claim 13 wherein said panel layer comprises static cling plastic material.

16. The one-way vision panel assembly according to claim 14 wherein:

said panel layer comprises transparent material; and said first panel side of said panel layer includes separate paint layers of light-reflective color and dark color applied thereon.

17. The one-way vision panel assembly according to claim 15 wherein said panel layer comprises transparent material; and said fist panel side of said panel layer includes separate paint layers of light-reflective color and dark color applied thereon.

18. The one-way vision panel assembly according to claim 14 wherein:

said adhesive layer is colored black;

said panel layer comprises transparent material; and said first panel side of said panel layer step includes a layer of light-reflective color applied thereon.

* * * * *